United States Patent [19]
Becker

[11] Patent Number: 5,795,030
[45] Date of Patent: Aug. 18, 1998

[54] ABDOMEN-PROTECTIVE ADAPTER FOR SEAT BELTS

[76] Inventor: Karl W. Becker, P.O. Box 671593, Chugiak, Ak. 99567

[21] Appl. No.: 719,151

[22] Filed: Sep. 24, 1996

[51] Int. Cl.[6] .................. A47C 31/00; A47D 15/00; B60R 21/00
[52] U.S. Cl. .............. 297/488; 297/465; 297/468; 297/482; 297/487; 280/808
[58] Field of Search .................. 297/488, 487, 297/482, 468, 465; 280/808

[56] References Cited

U.S. PATENT DOCUMENTS

| | | | |
|---|---|---|---|
| 3,941,404 | 3/1976 | Otaegui-Ugarte | 297/488 X |
| 3,992,040 | 11/1976 | Gannac | 297/465 |
| 4,143,914 | 3/1979 | Klich | 297/465 |
| 4,575,874 | 3/1986 | Johnson | 297/482 X |
| 4,610,463 | 9/1986 | Efrom | 297/488 X |
| 4,619,468 | 10/1986 | Spill | 297/488 X |
| 4,678,205 | 7/1987 | Wold | 280/808 |
| 4,741,574 | 5/1988 | Weightman et al. | 297/482 |
| 4,795,190 | 1/1989 | Weightman et al. | 280/808 |
| 4,951,965 | 8/1990 | Brown | 297/482 X |
| 5,005,865 | 4/1991 | Kruse | 297/468 X |
| 5,080,441 | 1/1992 | Stevenson et al. | 297/488 |
| 5,125,718 | 6/1992 | Czerakowski et al. | 297/487 X |
| 5,135,257 | 8/1992 | Short | 297/482 X |
| 5,154,446 | 10/1992 | Blake | 280/808 |
| 5,161,258 | 11/1992 | Coltrain | 297/465 X |
| 5,178,439 | 1/1993 | McCracken | 297/482 |
| 5,213,366 | 5/1993 | Sweger | 297/465 X |
| 5,215,333 | 6/1993 | Knight | 297/482 X |
| 5,248,187 | 9/1993 | Harrison | 297/488 X |
| 5,275,468 | 1/1994 | Vacanti | 297/482 X |
| 5,335,957 | 8/1994 | Golder | 297/482 |
| 5,421,614 | 6/1995 | Zheng | 297/482 X |
| 5,468,020 | 11/1995 | Scimi | 280/808 |
| 5,566,871 | 10/1996 | Weintraub | 297/482 X |

*Primary Examiner*—Peter M. Cuomo
*Assistant Examiner*—Rodney B. White
*Attorney, Agent, or Firm*—Michael J. Tavella

[57] ABSTRACT

A seat belt pad with a padded area for abdominal support. There are two basic embodiments one for two-point seat belts and the other for three-point seat belts. The two-point belt has an oval shaped pad that has seat belt fittings on both sides of the pad. The vehicle's seat belts can then be clipped to the fittings on the pad. In this way, the pad, which is considerably larger than an ordinary seat belt, protects the user's abdomen. The pad is designed to have equal or greater strength than ordinary seat belts. The three point-pad has two outer bands that fit over an ordinary three-point seat belt. The bands have VELCRO attaches to close the bands around the seat belts. A layer of mesh extends between the belts and is used to support the user's abdomen.

15 Claims, 12 Drawing Sheets

ABDOMEN-PROTECTIVE ADAPTER FOR SEAT BELTS

This invention relates to seat belt adapters and particularly to seat belt adapters for pregnant women and people suffering from abdominal injuries.

BACKGROUND OF THE INVENTION

There are two basic types of seat belts in use today. First, is the "two-point" belt. Two-point belts are most commonly found in airplanes and older model vehicles. The second type of belt is the "three-point" seat belt. These belts incorporate a lap belt and a shoulder belt in one harness. Three-point belts are found on virtually all modern cars and small trucks.

Seat belts of both types are made from thin belts of material that are only a few inches wide. In the case of the two-point belts, a buckle attaches two lengths of belt around the center of a user's waist. Three-point belts typically lie across a user's body and are secured to a holder usually located beside the user.

Although seat belts are very effective at protecting operators and passengers in vehicles, two classes of people are affected negatively by the narrow belts. First, pregnant women, who risk injury to their fetuses and second, people suffering from abdominal injuries or recent surgery. The pressure of the belt on the abdomen can cause pain or injury in both cases.

Moreover, a recurring problem has developed with the rise in the availability of airbags. Several people have been injured or killed by not using seat belts with air bags. There are renewed efforts to get people to use seat belts and to encourage seat belt use by children.

BRIEF SUMMARY OF THE INVENTION

The instant invention overcomes the limitations of both seat belt designs by providing a padded area of abdominal support. There are two basic embodiments of the invention: one for two-point belts and the other for three-point belts.

The two-point belt has an oval shaped pad that has seat belt fittings on both sides of the pad. The vehicle's seat belts can then be clipped to the fittings on the pad. In this way, the pad, which is considerably larger than an ordinary seat belt, protects the user's abdomen. The pad is designed to have equal or greater strength than ordinary seat belts.

The three-point pad has two outer bands that fit over an ordinary three-point seat belt. The bands have VELCRO strips to close and hold the bands around the seat belts. A layer of mesh extends between the belts and is used to support the user's abdomen.

Finally, the seat belts pads, especially the two-point design, can be decorated with dinosaurs or other designs to appeal to children. In this way, the pads can encourage the use of seat belts by children.

It is an object of this invention to produce a two-point seat belt pad that can be used to protect people from injuries caused by pressure of seat belts on people's abdomens.

It is an object of this invention to produce a three-point seat belt pad that can be used to protect people from injuries caused by pressure of seat belts on people's abdomens.

It is an object of this invention to produce a seat belt pad that is decorated with designs that appeal to children to encourage use of seat belts.

DETAILED DESCRIPTION OF THE INVENTION

Figure 1:
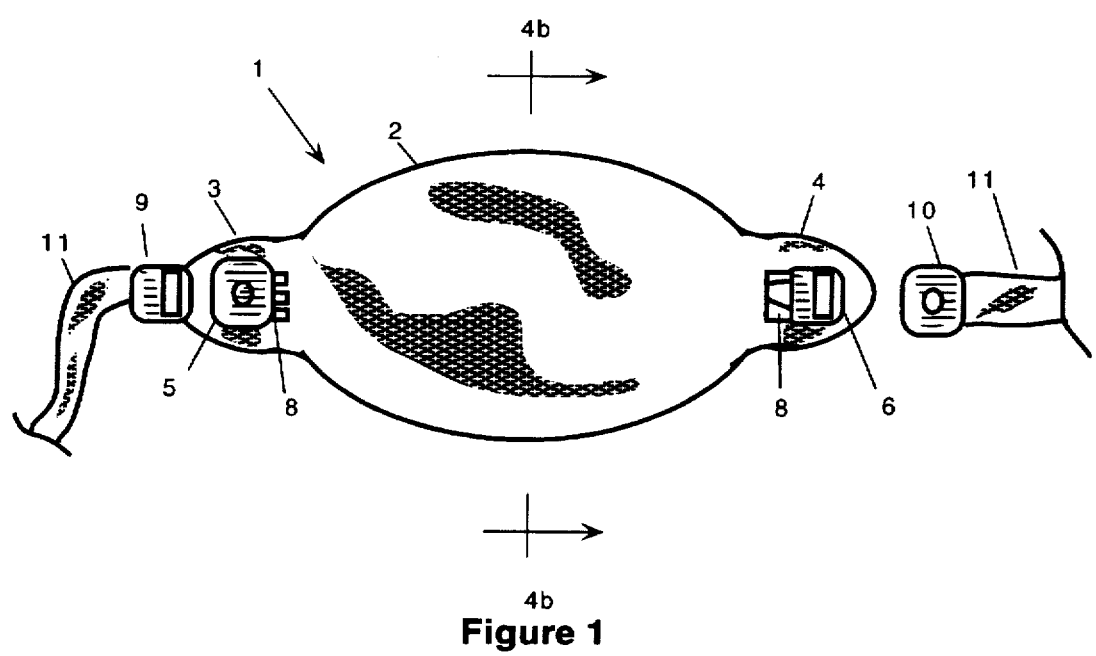
FIG. 1 is a front view of the two-point seat belt pad.

Referring now to FIG. 1, the two-point seat belt pad 1 is shown. In this figure, the pad 1 has a center portion 2, and two end flap portions 3 and 4. The end flap portions 3 and 4 are used to support standard two-point seat belt hardware. The end flap portions 3 and 4 can be attached as separate parts. In the preferred embodiment, however, the end flap portions 3 and 4 are extensions of the center portion 2, as discussed below (see also FIGS. 4 and 4a). In this figure, a buckle 5 and a clip 6 are shown. The buckle 5 and the clip 6 are designed to connect to the existing vehicle seat belt hardware. In FIG. 1, a clip 9, a buckle 10 and belts 11 are shown. In practice, the pad 1 has different styles of buckles and clips that mate with the different styles of buckles and clips used with existing vehicle and airplane seat belts. For example, the buckles and clips used on airplanes are different from those used in cars and trucks. This means that each pad 1 has a particular style of seat belt hardware as needed to coordinate with the seat belt hardware in the vehicle being used. Although each pad 1 has potentially different styles of seat belt hardware, the construction of the pad 1 is the same regardless of the type of seat belt hardware used.

Figure 2:
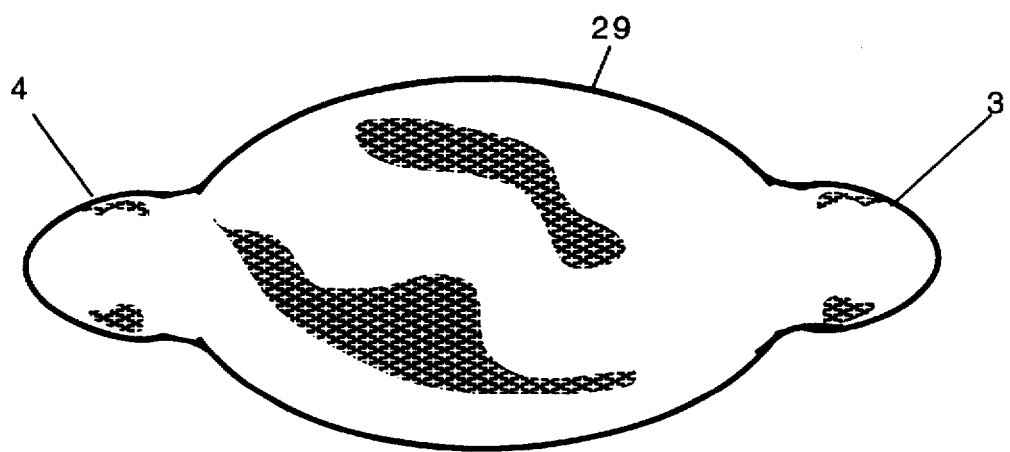
FIG. 2 rear view of the two-point seat belt pad
Figure 3:
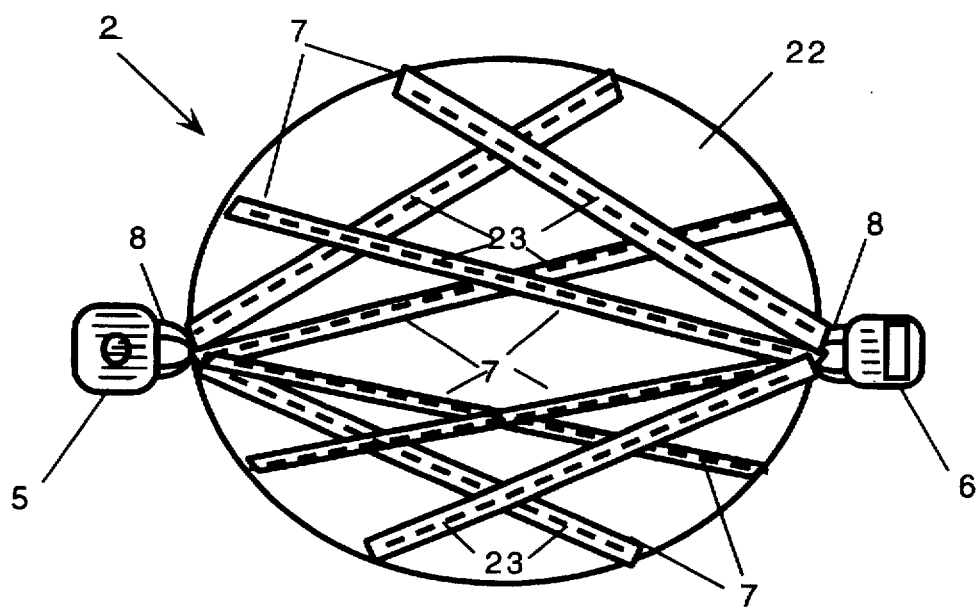
FIG. 3 is front view of the front half of two-point seat belt pad with the front cover and padding removed, showing the straps and their stitching arrangement.

The buckle 5 and the clip 6 are attached to the pad 1 at the center portion 8 of the straps 7, as discussed below. See, e.g., FIG. 3. As shown in FIG. 3, the straps 7 are laid out within the center portion 2 of the pad 1 as shown. The straps 7 are laid out so that the center portion 8 of each strap protrudes beyond the edges of the center portion 2. These center portions 8 form loops that attach the buckle 5 and the clip 6 to the pad 1. The straps 7 are arranged as shown to provide the strongest possible holding power for the seat belt hardware. FIG. 2 shows the back side of the pad 1.

Figure 3A:
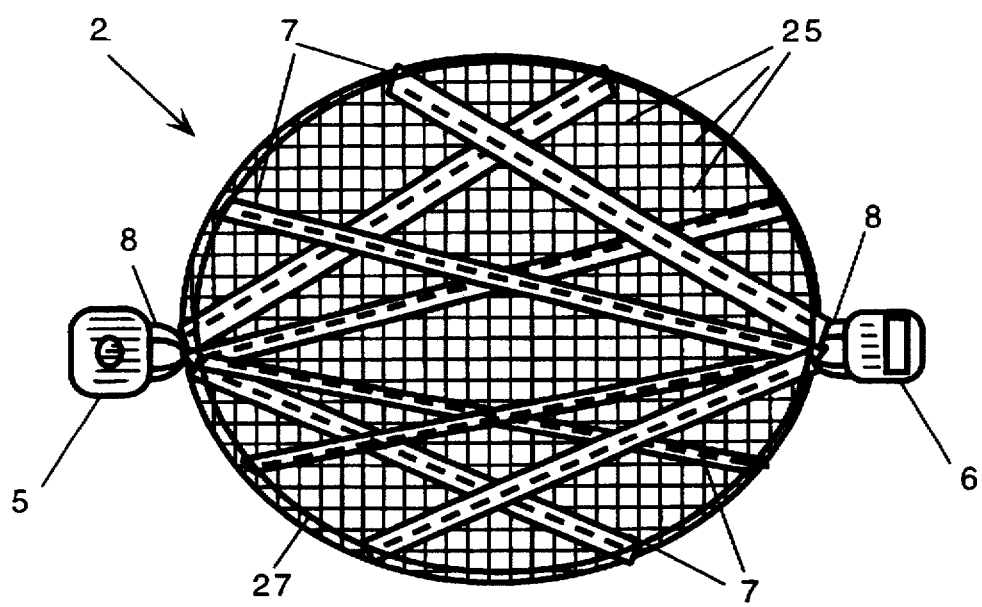
FIG. 3a rear view of the front half of the two-point seat belt pad.
Figure 4:
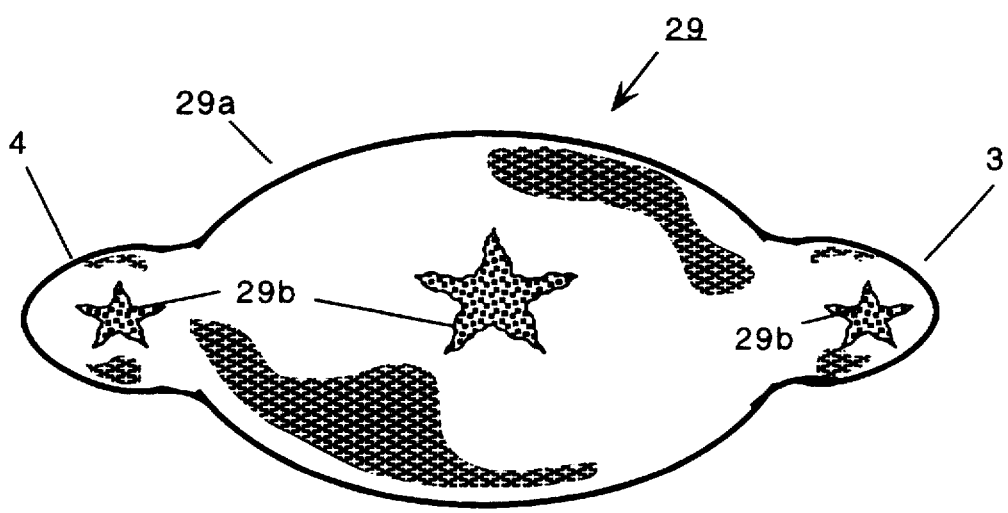
FIG. 4 is a front view of the back pad of the two-point seat belt pad, being partially cutaway.
Figure 4A:
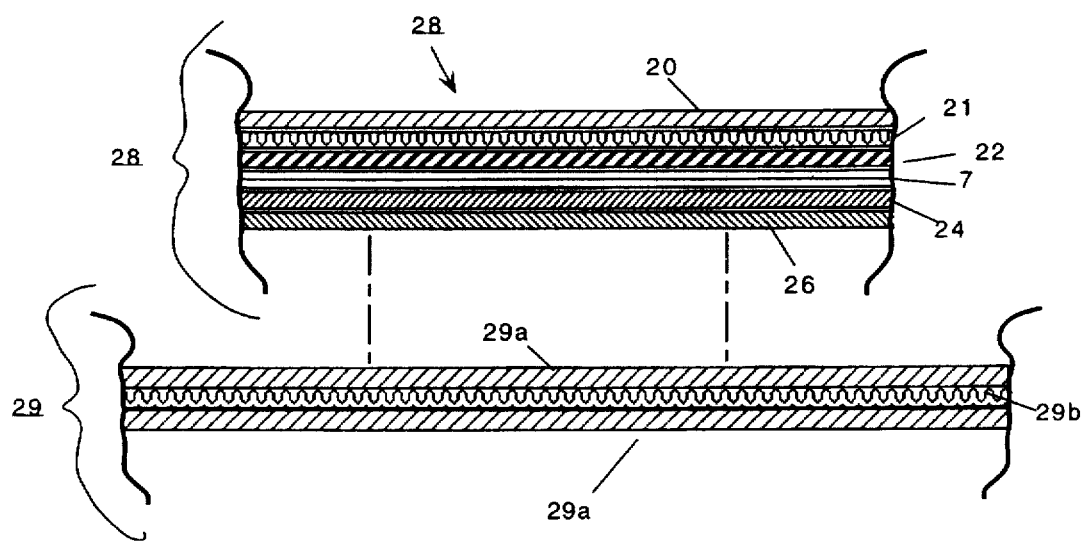
FIG. 4a is a partially-exploded cross-sectional view of the two-point pad taken along the lines 4b—4b of FIG. 1.

FIGS. 3 and 3a show the actual make up of the center portion 2 of the pad 1. FIG. 3 also shows the stitching pattern used to secure the straps in place. Referring now to FIG. 4a details of the layered construction of the two-point pad 1 are shown. At the front of the pad 1 is a layer of cloth 20. In the preferred embodiment, this layer 20 is made of either KEVLAR, a high strength fabric material, or a 1000 denier cloth material. Behind the cover material 20 is a layer of ⅛ inch padding 21. Behind this layer of padding 21 is a base attachment material 22. In the preferred embodiment, the base attachment material 22 is a 14 ounce cotton duck cloth or similar type material. Behind layer 22 are the straps 7. The preferred material for the straps 7 is a 2000 psi nylon tubing. The dimensions of which conform to the size of the buckle 5 and the clip 6.

Note that the arrangement of the straps 7 is not random. By layering the straps 7 as shown, they provide a tremendous holding force that exceeds the strength of the vehicle's seat belts. During construction of the pad 1, two straps 7 are passed through the buckle 5 and two straps 7 are passed through clip 6. These straps are then folded back, which forms the loops 8, and are then stitched to the base layer 22, along with the other straps 7. As shown in FIG. 3, the straps 7 are stitched along their length with rows of stitches 23 as shown. This stitching pattern forms a web that maximizes energy dispersion.

Behind the straps 7 is a layer of "plastic canvas" material 24, as it is called in the industry. The base layer 22, the straps 7 and the plastic canvas 24 are then all stitched together in a criss-cross pattern of stitches 25 (see FIG. 3a). All stitching uses 90 pound polyester thread or better.

It is possible, but not preferred, to insert another layer of padding 21 just behind the rear cover 26.

Finally, a rear cover 26 is attached to tie the entire pad 1 together. The rear cover 26 is identical to the front cover 20 in size, shape and material. The entire assembly is stitched closed with a layer of stitches 27, which are shown in FIG. 3a. This then forms the front pad assembly 28.

Figure 4B:
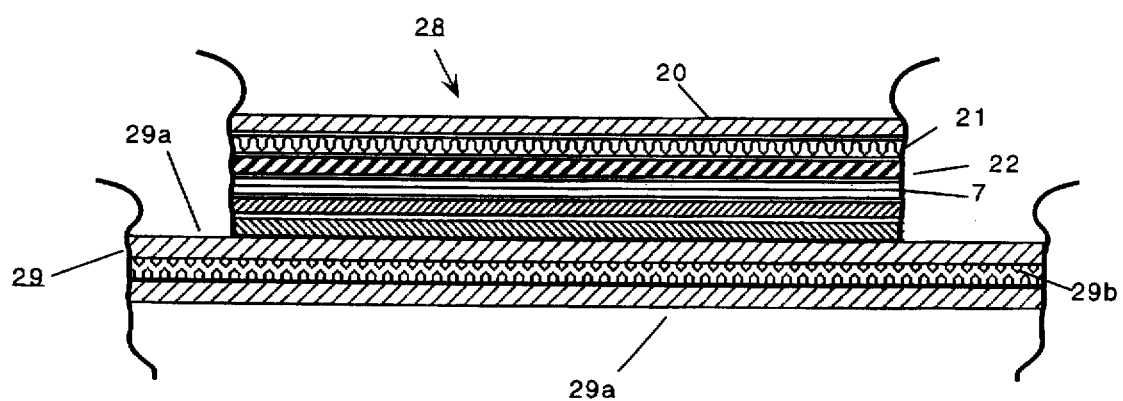
FIG. 4b is an assembled cross-sectional view of the two-point pad taken along the lines 4b—4b of FIG. 1.

A back pad 29 (see FIG. 4) is then attached to the assembly 28. In the preferred embodiment, back pad 29 has front and rear covers 29a as shown. The front and rear covers 29a have the flap portions 3 and 4 integrally formed as part of front and rear covers 29a as shown in FIG. 4. The back pad 29 is formed of the same material as the covers 20 and 26 and is filled with a layer of ⅛ inch padding 29b. See FIG. 4b.

Figure 8:
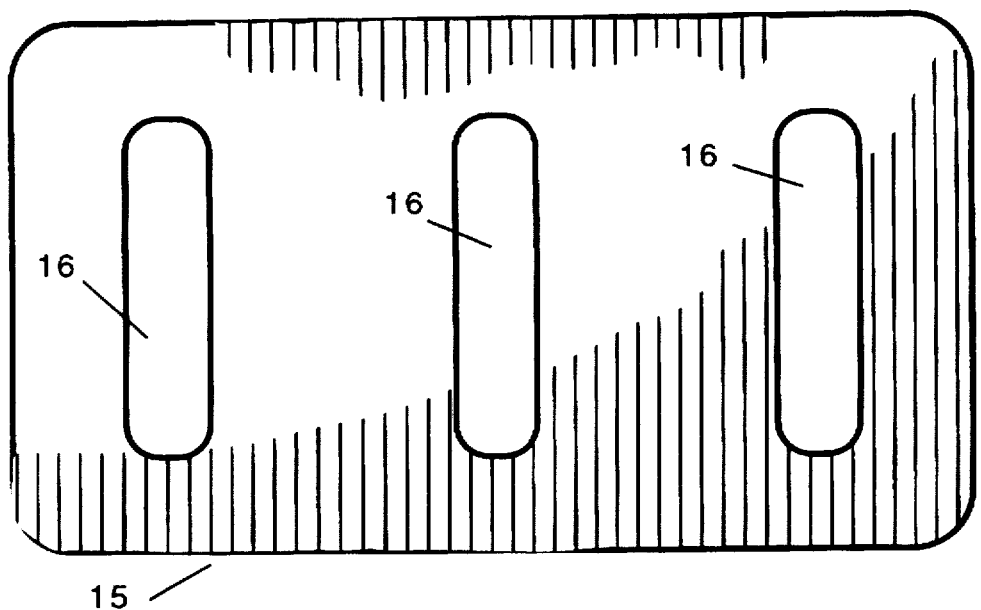
FIG. 8 is a front view of a shortening plate.
Figure 9:
FIG. 9 is a top view of a shortening plate.
Figure 10:
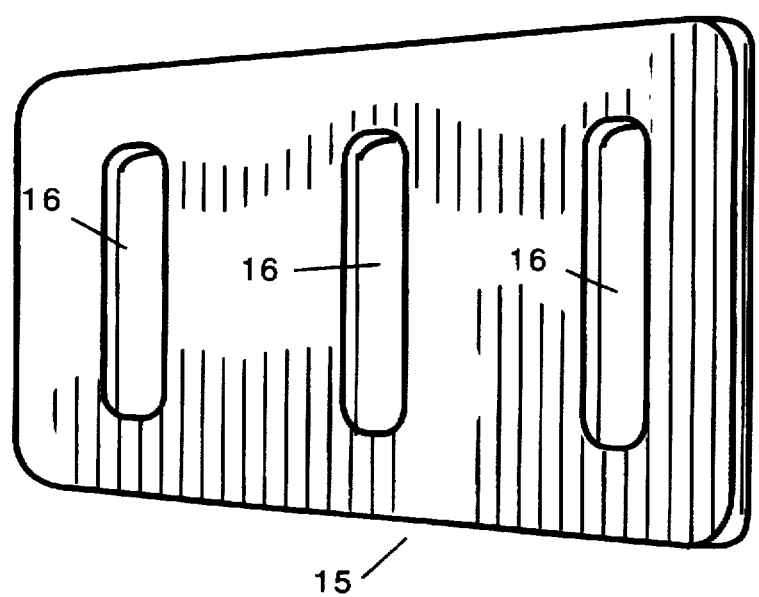
FIG. 10 is a perspective view of the shortening plate.

The pad 1 is used by placing the vehicle's seat belt hardware into the coordinating hardware on the pad 1. In many cases, a shortening plate 15 (see FIGS. 8, 9 and 10) is needed to provide proper tension. This plate is placed over the vehicle's seat belt 100. Then, the belt 100 is wrapped through the slots 16 formed in the plate 15 as needed to take up the slack in the seat belt.

Figure 5:
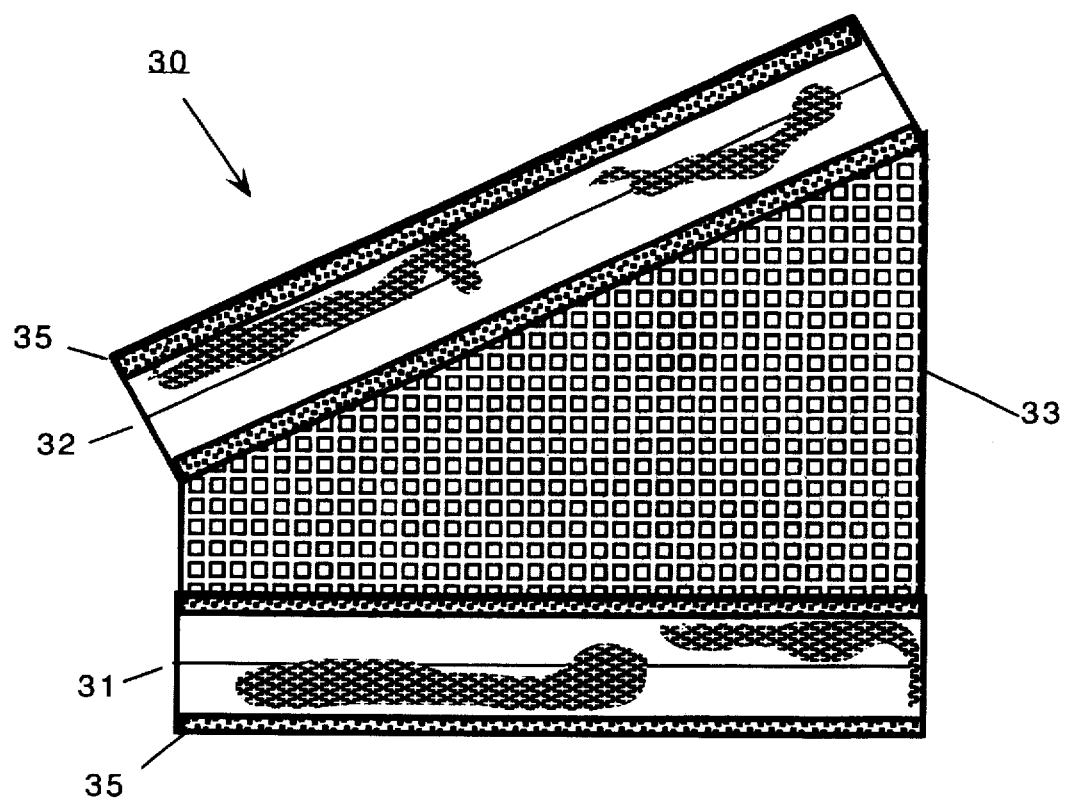
FIG. 5 is a front view of the three-point seat belt pad.
Figure 6:
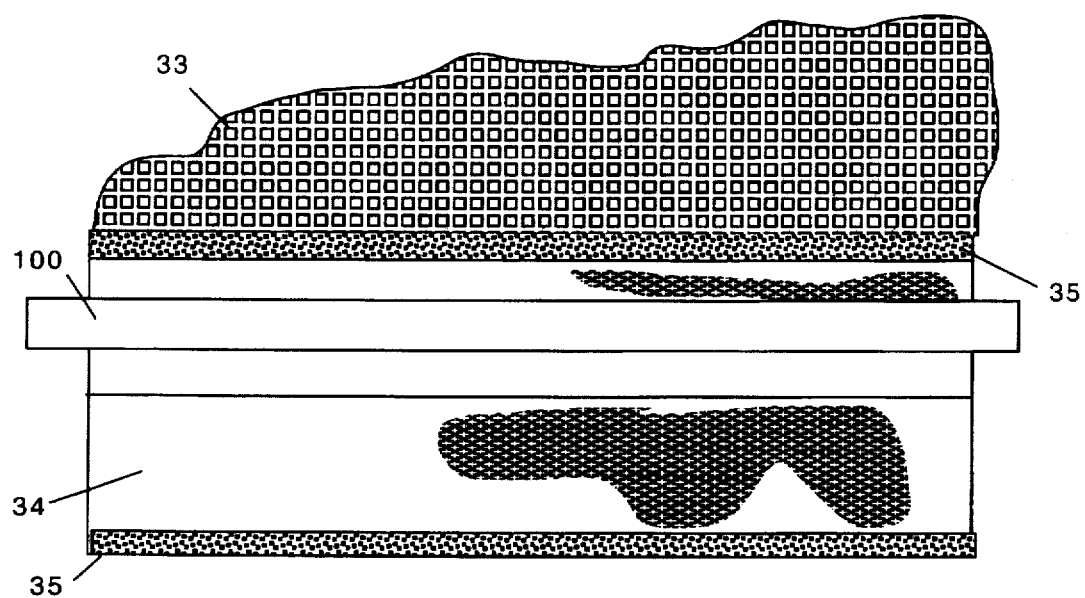
FIG. 6 is a detail view of one of the covering band for the three-point seat belt pad.
Figure 7:
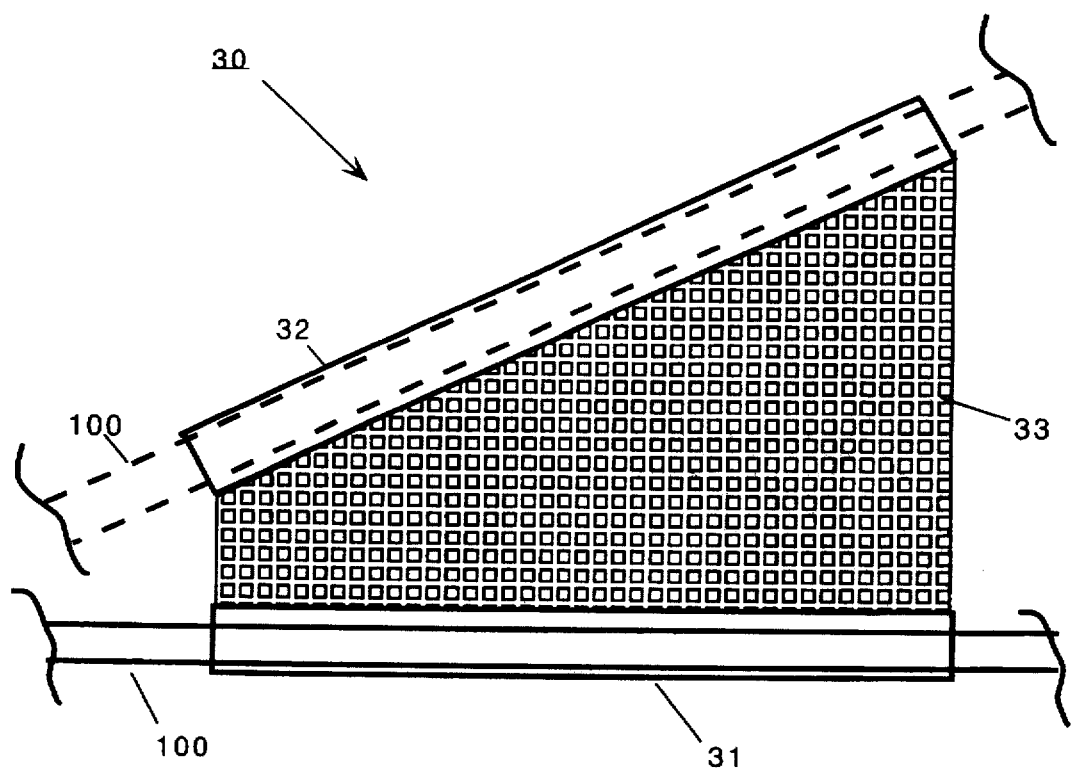
FIG. 7 is a front view of the three-point seat belt pad with a seat belt in place and the covering bands closed.

FIGS. 5, 6 and 7 show the seat belt pad 30 for three-point seat belt systems. These systems are found on virtually every modern automobile and most light trucks. This system has a lap belt coordinated with a shoulder belt. These belts terminate in one or two fixed clips within the vehicle. Unlike the two-point pads, which connect to the seat belt hardware directly, the three-point design is designed to be secured to the seat belt itself. Once secured on the seat belt, the pad 30 is designed not to interfere with the operation of the seat belt hardware, and does not connect to that hardware.

FIG. 5 shows that this pad 30 is made up of a lower band 31, an upper band 32, and a section of mesh 33, attached in between the bands 31 and 32. As shown, the mesh 33 conforms to the angle of the typical three-point belt system.

FIG. 6 shows the details of the bands 31 and 32. Each band 31 or 32 has a section of cloth 34 that has strips 35 of VELCRO, a hook and loop fastener, fastened as shown. The cloth 34 is creased to fold over the seat belt 100 see FIGS. 6 and 7. To attach the pad 30 to a seat belt 100, the bands 31 and 32 are opened; the seat belts 100 are placed in the open bands 31 and 32; and the bands 31 and 32 are then closed. Once in place, the pad 30 naturally fits over the abdomen of the user, providing protection from excessive forces by spreading the force over the surface area of the mesh.

The bands 31 and 32 are made of 1000 denier material and are heavily stitched for strength. The mesh 33 is a polyester or KEVLAR type material. As a unit, the seat belt pad 30 has strength equal to or better than the normal vehicle seat belt strength.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A seat belt pad for connection to a two-point seat belt system, said two-point seat belt system having a buckle-end, a clip end, and a seat belt having a length, said seat belt pad comprising:
    a) a central pad, having a first side and a second side, being oppositely disposed, and having a central cavity therein, said central pad also has a first plurality of internal straps, wherein each strap has a length, within said central pad and being fixedly attached thereto, and a second plurality of internal straps, wherein each strap has a length, within said central pad and being fixedly attached thereto, said first plurality of internal straps having a center portion, whereby the center portion of the first plurality of internal straps forms a first loop that protrudes from the first side of said central pad, and further such that said second plurality of internal straps has a center portion, whereby the center portion of the second plurality of internal straps forms a second loop that protrudes from the second side of said central pad, whereby said first loop forms a first connection end and said second loop forms a second connection end;
    b) a buckle, fixedly attached to said first connection end, whereby said buckle is positioned to removably connect to the clip end of said two-point seat belt system; and
    c) a clip, fixedly attached to said second connection end, whereby said clip is positioned to removably connect to the buckle end of said two-point seat belt system.

2. The seat belt pad of claim 1 further comprising a layer of padding material installed within said central cavity.

3. The seat belt pad of claim 1 further comprising a second layer of padding material installed within said central cavity.

4. The seat belt pad of claim 1 further comprising a layer of plastic canvas material installed within said central cavity.

5. The seat belt pad of claim 1 wherein said plurality of internal straps is secured to said central pad by a layer of stitches.

6. The seat belt pad of claim 5 wherein said layer of stitches comprises a series of rows of stitches, wherein each row of stitches runs along the length of each strap.

7. The seat belt pad of claim 1 further comprising a first pad fixedly attached to the first side of said seat belt pad, and a second pad fixedly attached to the second side of said seat belt pad, whereby both pads extend outwardly from said seat belt pad, whereby said buckle and said clip are supported by said pair of pads.

8. The seat belt pad of claim 1 further comprising a means for reducing the length of said seat belt.

9. The seat belt pad of claim 8 wherein the means for reducing the length of said seat belt comprise a bracket, having a plurality of holes, said bracket being removably attached to said seat belt whereby said seat belt is wrapped about said bracket, thereby reducing the length of said seat belt.

10. A seat belt pad for connection to a two-point seat belt system, said two-point seat belt system having a buckle end, a clip end, and a seat belt having a length, said seat belt pad comprising:

a) a front pad, said front pad having a front cover and a rear cover, said front and rear covers being stitched together and being oppositely disposed, such that said front and rear covers form a pocket having a central cavity therein, a first side, and a second side;

b) a layer of padding material, placed within said central cavity;

c) a base layer, of material fixedly paced with said central cavity;

d) a first plurality of internal straps, wherein each strap has a length, being placed within said central cavity and being fixedly attached to said base layer, and a second plurality of internal straps, wherein each strap has a length, being placed within said central cavity and being fixedly attached to said base layer, said first plurality of internal straps having a center portion, whereby the center portion of the first plurality of internal straps forms a first loop that protrudes from the first side of said central pad, and further such that said second plurality of internal straps has a center portion, whereby the center portion of the second plurality of internal straps forms a second loop that protrudes from the second side of said central pad, whereby said first loop forms a first connection end and said second loop forms a second connection end;

e) a layer of plastic canvas material installed within said central cavity, and being fixedly attached to said layer of padding material, said plurality of internal straps and said base layer, and further such that said plastic canvas material, said plurality of internal straps, said layer of padding material and said base layer are fixedly attached to said front pad;

f) a rear pad, having a cover, and being filled with a layer of padding material, said rear pad being fixedly attached to said front cover, said rear pad also having a first padded extension and a second padded extension;

g) a buckle, fixedly attached to said first connection end of said first plurality of internal straps, whereby said buckle is positioned to removably connect to the clip end of said two-point seat belt system; and c) a clip, fixedly attached to said second connection end of said second plurality of internal straps, whereby said clip is positioned to removably connect to the buckle end of said two-point seat belt system.

11. The seat belt pad of claim 10 wherein said plurality of internal straps is secured to said base layer by a layer of stitches wherein the layer of stitches includes a series of rows of stitches, wherein, each row of stitches runs along the length of each strap.

12. The seat belt pad of claim 10 further comprising a means for reducing the length of said seat belt.

13. The seat belt pad of claim 10 wherein the means for reducing the length of said seat belt comprises a bracket, having a plurality of holes, said bracket being removably attached to said seat belt whereby said seat belt is wrapped about said bracket, thereby reducing the length of said seat belt.

14. A seat belt pad for connection to a three-point seat belt system, said three-point seat belt system having a lap belt and a shoulder belt, said seat belt pad comprising:

a) a mesh net having a bottom edge, a pair of opposing side edges extending upwardly from said bottom edge, and an angled top edge corresponding to an angle of the shoulder belt in said three-point seat belt system;

b) a lap belt cover having a length of flexible material fixedly attached to said mesh net at said bottom edge and extending downwardly therefrom, said length of flexible material having a sufficient width to fold over on itself and enclose said lap belt;

c) a means for removably securing said length of flexible material about said lap belt;

d) a shoulder belt cover having a length of flexible material fixedly attached to said mesh net at said top edge and extending upwardly therefrom, said length of flexible material having a sufficient width to fold over on itself and enclose said shoulder belt; and e) a means for removably securing said length of flexible material about said shoulder belt.

15. The seat belt pad of claim 14 wherein the means for removably securing said length of flexible material about said lap belt and the means for removably securing said length of flexible material about said shoulder belt are selected from the group of: snaps, buttons, zippers, and lengths of hook and loop type fasteners.

* * * * *